(12) United States Patent
Yonekura et al.

(10) Patent No.: US 12,716,520 B2
(45) Date of Patent: Aug. 25, 2026

(54) AUTOMATIC PRESSURE CONTROL DEVICE, FILM FORMING APPARATUS AND PRESSURE CONTROL METHOD

(71) Applicants: TOKYO ELECTRON LIMITED, Tokyo (JP); CKD CORPORATION, Aichi (JP)

(72) Inventors: Satoshi Yonekura, Tokyo (JP); Tamaki Takeyama, Yamanashi (JP); Tatsuhiko Tanimura, Yamanashi (JP); Shigeyuki Okura, Yamanashi (JP); Yasunori Nishimura, Yamanashi (JP)

(73) Assignees: TOKYO ELECTRON LIMITED, Tokyo (JP); CKD CORPORATION, Aichi (JP)

( * ) Notice: Subject to any disclaimer, the term of this patent is extended or adjusted under 35 U.S.C. 154(b) by 162 days.

(21) Appl. No.: 18/233,243

(22) Filed: Aug. 11, 2023

(65) Prior Publication Data

US 2024/0052950 A1 Feb. 15, 2024

(30) Foreign Application Priority Data

Aug. 12, 2022 (JP) ................................ 2022-129020

(51) Int. Cl.
*F16K 39/02* (2006.01)
*G05D 16/16* (2006.01)

(52) U.S. Cl.
CPC .......... *F16K 39/028* (2013.01); *G05D 16/16* (2013.01)

(58) Field of Classification Search
CPC ............................. F16K 39/028; G05D 16/16
See application file for complete search history.

(56) References Cited

U.S. PATENT DOCUMENTS 3,048,363 A * 8/1962 Garrigan .............. F16K 1/2265 251/307
4,335,748 A * 6/1982 Olansen ............... F16K 1/2263 251/306
8,814,138 B2 * 8/2014 Helfer ................. F16K 1/2266 251/192

(Continued)

FOREIGN PATENT DOCUMENTS

JP 5747704 B2 * 7/2015
JP 2021-124133 A 8/2021
KR 1020210098850 A 8/2021

*Primary Examiner* — Angelisa L. Hicks
(74) *Attorney, Agent, or Firm* — Nath, Goldberg & Meyer; Jerald L. Meyer; Tanya E. Harkins

(57) ABSTRACT

An automatic pressure control device that controls a pressure in a processing container to which a source gas for forming a film on a substrate is supplied, includes: a vacuum exhauster configured to vacuum-exhaust a gas in the processing container; an exhaust path connecting the processing container and the vacuum exhauster; and a butterfly valve including an annular valve seat having an inner wall surface and a valve body configured as a plate-shaped body. The valve body is rotatably installed to the valve seat via a shaft and configured to change an opening area of the exhaust path by being arranged to be inclined and changing an inclination angle of the valve body. The butterfly valve is configured to control the pressure in the processing container by changing the inclination angle of the valve body based on a result of detecting the pressure in the processing container.

7 Claims, 10 Drawing Sheets

(56) References Cited

U.S. PATENT DOCUMENTS

| | | | | |
|---|---|---|---|---|
| 9,028,648 | B1 * | 5/2015 | Kamakura | H01L 21/0228 156/345.33 |
| 9,340,879 | B2 * | 5/2016 | Yahata | C23C 16/4405 |
| 10,408,355 | B2 * | 9/2019 | Abouelleil | F16K 25/00 |
| 11,105,274 | B1 * | 8/2021 | Ishii | F02D 9/107 |
| 11,248,713 | B2 * | 2/2022 | Nasu | F16K 1/24 |
| 2008/0073612 | A1 * | 3/2008 | Day | F16J 15/121 251/306 |
| 2009/0117270 | A1 * | 5/2009 | Yamasaki | C23C 16/0227 427/248.1 |
| 2011/0008955 | A1 * | 1/2011 | Horii | C23C 16/40 118/704 |
| 2018/0224001 | A1 * | 8/2018 | Malik | F16K 1/222 |
| 2021/0239219 | A1 * | 8/2021 | Nishimura | F16K 1/221 |

* cited by examiner

AUTOMATIC PRESSURE CONTROL DEVICE, FILM FORMING APPARATUS AND PRESSURE CONTROL METHOD

CROSS-REFERENCE TO RELATED APPLICATION

This application is based upon and claims the benefit of priority from Japanese Patent Application No. 2022-129020, filed on Aug. 12, 2022, the entire contents of which are incorporated herein by reference.

TECHNICAL FIELD

The present disclosure relates to an automatic pressure control device, a film forming apparatus, and a pressure control method.

BACKGROUND

In a semiconductor device manufacturing process, for example, a raw material gas and a reaction gas are supplied into a processing container adjusted to a vacuum state, and a film formation processing is performed on a semiconductor wafer (hereinafter referred to as a wafer), which is a substrate. Patent Document 1 describes a vacuum pressure control device that, in a technique for forming a film on a wafer, controls the pressure in a vacuum chamber by a non-sealing butterfly valve provided in a pipe when performing exhaust in the vacuum chamber and adjusting the pressure in the vacuum chamber.

PRIOR ART DOCUMENTS

Patent Documents

Patent Document 1: Japanese Patent Laid-Open Publication No. 2021-124133

SUMMARY

According to one embodiment of the present disclosure, there is provided an automatic pressure control device that controls a pressure in a processing container to which a source gas for forming a film on a substrate is supplied. The automatic pressure control device includes: a vacuum exhauster configured to vacuum-exhaust a gas in the processing container; an exhaust path connecting the processing container and the vacuum exhauster; and a butterfly valve including an annular valve seat having an inner wall surface forming a portion of the exhaust path, and a valve body configured as a plate-shaped body that blocks at least a portion of a cross section that transverses the annular valve seat, the valve body being rotatably installed to the valve seat via a shaft and configured to change an opening area of the exhaust path by being arranged to be inclined and changing an inclination angle of the valve body with respect to the cross section by the shaft, and the butterfly valve being configured to control the pressure in the processing container by changing the inclination angle of the valve body based on a result of detecting the pressure in the processing container. Assuming that, when viewed from an upstream side in a flow direction of the gas in the exhaust path, an upstream side surface of the valve body is called a front surface and a downstream side surface is called a rear surface, a first tapered surface is formed on the front surface of the valve body in a region located at a downstream side end portion in the flow direction when the valve body is arranged to be inclined, and a second tapered surface is formed on the rear surface of the valve body in a region located at an upstream side end portion in the flow direction when the valve body is arranged to be inclined. When the valve body is arranged to be inclined, the valve body is used with the inclination angle within a range of 10 degrees to 30 degrees, and each of an angle formed between the first tapered surface and a region of the front surface excluding the first tapered surface and an angle formed between the second tapered surface and a region of the rear surface excluding the second tapered surface is greater than 95 degrees and less than or equal to 150 degrees.

BRIEF DESCRIPTION OF DRAWINGS

The accompanying drawings, which are incorporated in and constitute a part of the specification, illustrate embodiments of the present disclosure, and together with the general description given above and the detailed description of the embodiments given below, serve to explain the principles of the present disclosure.

DETAILED DESCRIPTION

Reference will now be made in detail to various embodiments, examples of which are illustrated in the accompanying drawings. In the following detailed description, numerous specific details are set forth in order to provide a thorough understanding of the present disclosure. However, it will be apparent to one of ordinary skill in the art that the present disclosure may be practiced without these specific details. In other instances, well-known methods, procedures, systems, and components have not been described in detail so as not to unnecessarily obscure aspects of the various embodiments.

Figure 1:
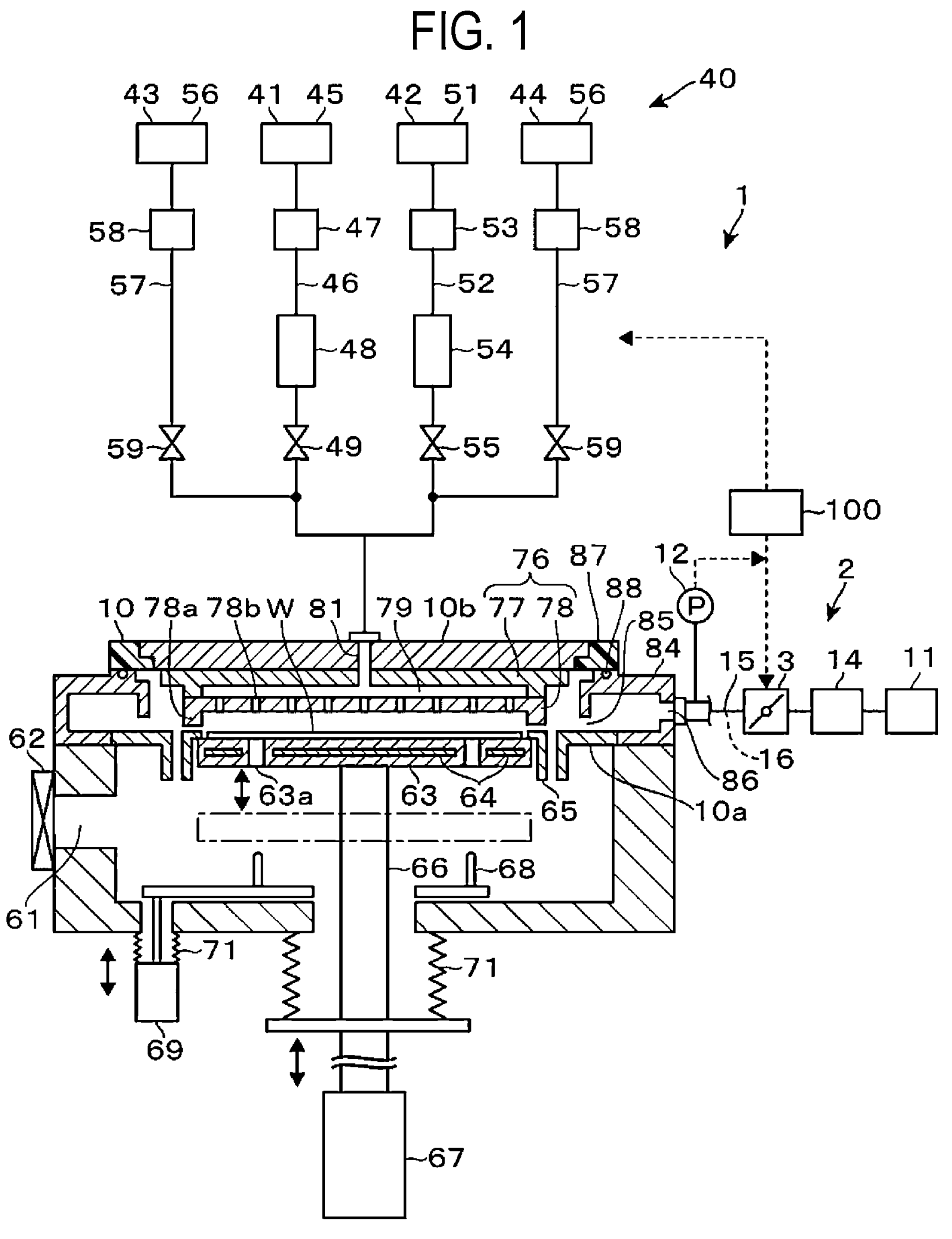
FIG. 1 is a vertical cross-sectional side view of a film forming apparatus according to an embodiment of the present disclosure.

A single-wafer type film forming apparatus, which is an embodiment of an apparatus for forming a film on a wafer W of the present disclosure (hereinafter, referred to as a "film forming apparatus"), will be described with reference to FIG. 1. A film forming apparatus 1 includes a processing container 10 that accommodates a substrate (e.g., a wafer W) and a controller 100. The controller 100 includes a data processor configured with, for example, a computer including programs, a memory, and a CPU. The programs incorporate instructions for sending control signals from the controller 100 to each part of the film forming apparatus 1 and for advancing respective processes related to film formation (film forming processes). The programs are stored in a storage, such as a computer storage medium, for example, a flexible disk, a compact disk, a hard disk, a magneto-optical disk (MO), a non-volatile memory, or the like, and are installed in the controller 100. The controller 100 controls and operates each component to be described later in the film forming apparatus 1 according to an operator's operation and a predetermined program.

The processing container 10 is made of a metal such as aluminum (Al), and has a substantially cylindrical shape. A carry-in/out port 61 for carrying in or out a wafer W is formed in the side wall of the processing container 10 to be openable/closable by a gate valve 62. A stage 63 configured to horizontally support a wafer W is provided inside the processing container 10, and the stage 63 is formed in a disk shape from a ceramic material such as aluminum nitride (AlN) or a metal material such as aluminum or nickel alloy. In this example, the stage 63 is embedded with a substrate heater 64 serving as a heater for heating the wafer W to a temperature within a range of about 300 degrees C. to 500 degrees C. The peripheral region of the top surface and the side surface of the stage 63 are covered with a cover member 65 made of ceramic such as alumina.

The stage 63 is connected, via a support member 66, to a lifting mechanism 67 provided below the processing container 10, and is configured to be raised/lowered between a processing position illustrated in FIG. 1 and a wafer W delivery position illustrated by the one-dot chain line below the processing position. In FIG. 1, reference numeral **10*a* indicates a partition member for partitioning the interior of the processing container 10 into an upper portion and a lower portion when the stage 63 is raised to the processing position. Below the stage 63 within the processing container 10, three support pins 68 (only two of which are illustrated) are provided below the stage 63 to be raised/lowered by a pin lifting mechanism 69 provided below the processing container 10. The support pins 68 are inserted through through-holes 63*a* in the stage 63 located at the delivery position to be capable of protruding/retracting with respect to the top surface of the stage 63, and are used for delivery of a wafer W between an external transport mechanism (not illustrated) and the stage 63. Reference numeral 71 in the figure indicates bellows that partition the atmosphere inside the processing container 10 from the outside air and expand/contract as the stage 63 and the support pins 68** are raised/lowered.

The processing container 10 is provided with a shower head 76, which is configured to supply a processing gas into the processing container 10 in a shower form, to face the stage 63. The shower head 76 includes a main body 77 fixed to a ceiling wall **10*b* of the processing container 10 and a shower plate 78 connected under the main body 77, and the interior of the shower head forms a gas diffusion space 79. An annular protrusion 78*a* protruding downward is formed at the peripheral edge of the shower plate 78, and gas ejection holes 78*b* are formed in the flat surface inside the annular protrusion 78*a*. A gas supplier 40 is connected to the gas diffusion space 79 via a gas introduction hole 81**.

The gas supplier 40 includes a source gas supplier 41 configured to supply, to the processing container 10, a source gas containing a raw material of a film to be formed on the wafer W, a reaction gas supplier 42 configured to supply a reaction gas that reacts with the source gas, and purge gas suppliers 43 and 44 configured to supply a purge gas. The source gas supplier 41 includes a source gas source 45 and a supply path 46, and the supply path 46 is provided with a flow rate regulator 47, a storage tank 48 and a valve 49 from the upstream side.

Similar to the source gas supplier 41, the reaction gas supplier 42 includes a reaction gas source 51 and a supply path 52, and the supply path 52 is provided with a flow rate regulator 53, a storage tank 54, and a valve 55 from the upstream side. The purge gas suppliers 43 and 44 each include a purge gas source 56 and a supply path 57, and each supply path 57 is provided with a flow path regulator 58 and a valve 59. The supply path 57 of one purge gas supplier 43 is connected to the supply path 46 of the source gas in order to purge the source gas, and the supply path 57 of the other purge gas suppler 44 is connected to the supply path 52 of the reaction gas in order to purge the reaction gas.

Hereinafter, a case where a hafnium oxide ($HfO_2$) film is formed on a wafer W will be described as an example. In this case, the source gas is a hafnium (Hf)-based gas, and specifically, a gas containing cyclopentadienyl tris(dimethylamino) hafnium ($CpHf(NMe_2)_3$) may be exemplified. The reaction gas is an oxygen-based gas, and specifically, a gas containing ozone ($O_3$) may be exemplified. The purge gas is, for example, a nitrogen (N)-based gas, specifically a gas containing nitrogen ($N_2$). The above-described configuration included in the gas supplier 40 is controlled by the controller 100.

An annular exhaust duct 84 having, for example, a rectangular cross section is disposed above the side wall of the processing container 10. The exhaust duct 84 is provided with a slit 85 along the inner peripheral surface of the exhaust duct 84, and an exhaust port 86 is formed in the outer wall of the exhaust duct 84. A ceiling wall **10*b* is provided on the top surface of the exhaust duct 84 to close an upper opening of the processing container 10 via an insulating member 87, and the space between the exhaust duct 84 and the insulating member 87 is hermetically sealed with a seal ring 88**.

The film forming apparatus 1 includes an automatic pressure control mechanism (automatic pressure control device) 2 that performs exhaust and pressure regulation of the interior of the processing container 10. The automatic pressure control mechanism 2 includes a vacuum exhauster 11 configured to vacuum-exhaust the gas inside the processing container 10, a pressure detector 12 configured to detect the pressure inside the processing container 10, and an automatic pressure controller (APC) valve 3, a shut valve 14 configured to open/close the exhaust path 16, and an exhaust pipe 15 connecting the components to the exhaust duct 84.

The exhaust pipe 15 forms an exhaust path 16 through which the gas discharged from the exhaust duct 84 through the exhaust port 86 flows as exhaust streams. The cross-sectional shape of the exhaust pipe 15 and the exhaust path 16 is, for example, a circle. The exhaust path 16 connects the exhaust port 86 of the exhaust duct 84, the pressure detector

12, the APC valve 3, the shut valve 14, and the vacuum exhauster 11 in this order. Specifically, the pressure detector 12 is provided in the immediate vicinity of the exhaust port 86. Accordingly, a pressure detection value of the pressure detector 12 may be regarded as a pressure detection value inside the processing container 10.

The vacuum exhauster 11 is configured with a vacuum pump, such as a dry pump. The shut valve 14 is provided upstream of the vacuum exhauster 11 and configured to open/close the exhaust path 16. A shut valve 14 is used to close the exhaust path 16.

Figure 2A:
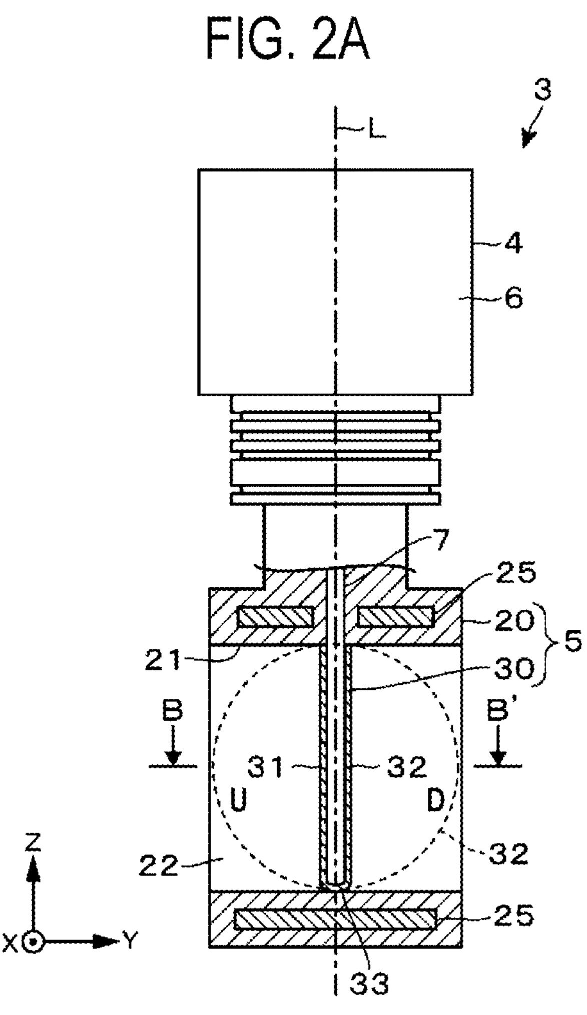
FIGS. 2A and 2B are schematic vertical cross-sectional side views illustrating an APC valve of the film forming apparatus according to an embodiment of the present disclosure.
Figure 2B:
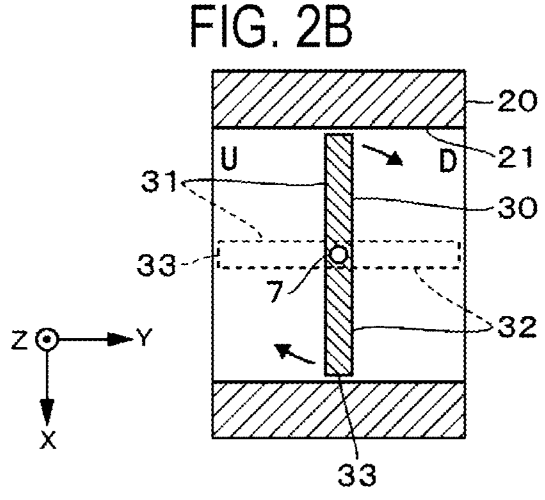

FIG. 2A is a schematic cross-sectional side view of the APC valve 3, and FIG. 2B is a schematic cross-sectional view taken along line B-B' in FIG. 2A. The APC valve 3 is configured with, for example, a leakage-type butterfly valve, and includes a drive mechanism 4 and a valve mechanism 5. The drive mechanism 4 includes a controller (not illustrated), a motor 6, and a shaft 7. The motor 6 includes a drive part, a driver, an encoder, and a rotation shaft (none of which are illustrated). The rotation shaft is rotated by the drive part. The pressure detector 12 and the driver of the motor 6 are connected to the controller of the drive mechanism 4. The controller of the drive mechanism 4 acquires target pressure information from the controller 100. The controller of the drive mechanism 4 stores rotation angles of the rotation shaft as operation amounts associated with, for example, difference values between target pressures and pressure detection values of the pressure detector 12. The driver of the motor 6 controls the rotation angle of the drive part based on the rotation angle, which is output from the controller of the drive mechanism 4 according to the detection result of the pressure detector 12, thereby controlling the processing container 10 to an arbitrary target pressure.

The base end of the shaft 7 is connected to the rotation shaft of the motor 6 such that the central axes of the rotation shaft and the shaft 7 are aligned with each other, and the rotation shaft of the motor 6 rotates about the central axis L thereof and rotates the shaft 7 about the central axis L. Hereinafter, the central axis L of the rotation shaft will be referred to as the rotation axis L of the shaft 7. The tip end of the shaft 7 is disposed inside the valve mechanism 5.

The valve mechanism 5 includes a valve seat 20 having a ring-shaped main body installed in the exhaust pipe 15 and a valve body 30 provided inside the valve seat 20. The valve mechanism 5 is made of, for example, stainless steel. The valve seat 20 is interposed in a midway portion of the exhaust pipe 15. The inner region of the inner wall surface 21 of the main body of the valve seat 20 constitutes a cylindrical inner space, forming a midway exhaust path 22 that connects the upstream and downstream exhaust paths 16 of the valve seat 20. The exhaust streams flow substantially uniformly from the exhaust pipe 15 upstream of the APC valve 3 into the upstream end of the midway exhaust path 22. A valve seat heater 25 is embedded in the valve seat 20, and heats the inner wall surface 21 of the valve seat 20 to about 200 degrees C.

For convenience of description, the XYZ orthogonal coordinate system is used in the description of the APC valve 3 in the present specification. As illustrated in FIGS. 2A and 2B, the direction from the upstream side U toward the downstream side D of the APC valve 3 is called the "direction Y." The flow direction of the exhaust streams flowing into the midway exhaust path 22 is parallel to the Y direction. A direction perpendicular to the direction Y is called the "direction X," and a direction perpendicular to the direction Y and the direction X is called the "direction Z." In the valve seat 20, the tip end of the shaft 7 is provided to penetrate through a portion extending in the radial direction from the center of the inner space.

The valve body 30 is configured with a plate-shaped member and provided in the inner space of the valve seat 20. Specifically, the valve body 30 is disk-shaped and may block at least a portion of an annular cross section across the valve seat 20. In addition, the valve body 30 may have a shape other than the disk shape, such as an elliptical shape or a rectangular shape, in which case the cross section of the valve seat 20 or the exhaust path 16 may also have a shape, such as an elliptical shape or a rectangular shape.

When viewed from the upstream side U of the exhaust path 16, the valve body 30 includes a front surface 31 which is the surface on the upstream side, a rear surface 32 which is the surface on the downstream side D, and an annular side surface 33 between the front surface 31 and the rear surface 32. The valve body 30 is installed at the tip end of the shaft 7 such that the extension of the shaft 7 is arranged along the diameter direction of the valve body 30. That is, the central axis of the valve body 30 is the same as the rotation axis L of the shaft 7, and when the shaft 7 is rotated, the valve body 30 rotates around the rotation axis L. By rotating around the rotation axis L, the valve body 30 changes the inclination angle with respect to the cross section of the valve seat 20.

When the inclination angle of the valve body 30 is zero degrees as illustrated by the solid lines in FIGS. 2A and 2B, the front surface 31 and the rear surface 32 of the valve body 30 are arranged in parallel to the cross section of the valve seat 20 and fully close the midway exhaust path 22 of the valve seat 20. A gap is formed between the side surface 33 of the valve body 30 and the inner wall surface 21 of the valve seat 20 when the valve body 30 is fully closed. The APC valve 3 of this embodiment is configured as a leakage-type butterfly valve in that a gap is formed between the valve body 30 and the valve seat 20 even when the valve body 30 is fully closed. In the leakage-type APC valve 3, the opening area of the midway exhaust path 22 when the valve body 30 is fully closed is the area of the gap between the inner wall surface 21 of the valve seat 20 and the side surface 33 of the valve body 30. When the inclination angle of the valve body 30 is zero degrees, the conductance of the midway exhaust path 22 is the smallest.

As indicated by the broken lines in FIGS. 2A and 2B, when the inclination angle of the valve body 30 is, for example, 90 degrees, the front surface 31 and the rear surface 32 of the valve body 30 are arranged perpendicular to the cross section of the valve seat 20, and the midway exhaust path 22 is fully opened. At the time of full opening, almost the entire midway exhaust path 22 becomes an opening area. When the inclination angle of the valve body 30 is 90 degrees, the conductance of the midway exhaust path 22 is the largest.

As described above, due to the change in the opening area of the midway exhaust path 22 depending on the inclination angle of the valve body 30, the APC valve 3 changes the exhaust amount from the processing container 10 and controls the pressure value in the processing container 10. For example, the automatic pressure control mechanism 2 regulates the pressure inside the processing chamber 10 within a range of, for example, 133 Pa (1 Torr) to 400 Pa (3 Torr) before starting the film forming process in the film forming apparatus 1. At this time, the automatic pressure control mechanism 2 is configured such that the inclination angle of the valve body 30 of the APC valve 3 can be changed within a range of, for example, 10 degrees to 30 degrees. Thereafter, the film forming process, which will be described below, may be started after the inclination angle of the valve body 30 after the pressure regulation is fixed while the vacuum exhauster 11 constantly performs exhaust. In addition, the pressure control for regulating the pressure inside the processing container 10 may be continued even during the period of the film forming process.

In the film forming process of the film forming apparatus 1, film formation is performed by, for example, an atomic layer deposition (ALD) method. In the ALD method, a first film forming process of supplying a source gas, a second film forming process of supplying a reaction gas, and a purge process of supplying only a purge gas after these processes are repeatedly performed. The gases supplied into the processing container 10 in the respective processes sequentially flow to the exhaust path 16 of the automatic pressure control mechanism 2. In the film forming apparatus 1, each of the first film forming process, the second film forming process, and the purge process is finished, for example, in around one second, and the process proceeds to the next process. At this time, the automatic pressure control mechanism 2 completes replacement of the gas inside the processing container 10 of the film forming apparatus 1 by constantly exhausting the interior of the processing container 10, but in some cases, the gas may stay in the exhaust path 16 of the automatic pressure control mechanism 2 and the replacement may not be completed. In such a case, in the exhaust path 16 of the automatic pressure control mechanism 2, the gas molecules contained in the remaining source gas and reaction gas are likely to react to generate by-products. As described above, when the source gas is a hafnium-based gas and the reaction gas is ozone, the by-products are, for example, oxides of hafnium, such as hafnium oxide ($HfO_2$).

Such by-products are likely to be generated at locations where the stagnation of exhaust streams in which gas tends to stagnate is likely to occur, at curved or narrowed locations of the exhaust path 16 where the exhaust streams are likely to collide, or the like. Specifically, in the automatic pressure control mechanism 2 of the present example, by-products are likely to be formed in the APC valve 3 or the shut valve 14. Therefore, in the APC valve 3, the opening area of the midway exhaust path 22 when the valve body 30 is fully closed is set wider than that of a leakage-type butterfly valve in the related art. In a general leakage-type butterfly valve, the width of the gap between the valve body 30 and the valve seat 20 when fully closed is, for example, 0.1 mm. In this regard, in the APC valve 3 of the present example, the width of the gap between the valve body 30 and the valve seat 20 when fully closed is set to 0.5 mm over the entire circumferences of the valve body 30 and the valve seat 20. The width of the gap between the valve body 30 and the valve seat 20 is the width dimension of the gap between the valve body 30 and the valve seat 20 viewed along the radial direction of the valve seat 20. The setting that the width of the gap between the valve body 30 and the valve seat 20 is 0.5 mm is preferably satisfied at all positions on the outer periphery of the valve seat 20. However, even when the width of the gap is less than 0.5 mm in some regions on the outer periphery, the gap may be 0.5 mm in average value.

In this case, the width of the gap between the valve body 30 and the valve seat 20 when fully closed is not limited to the above example and may be set within the range of 0.1 mm or more and less than 1 mm, preferably within the range of 0.3 mm or more and 0.6 mm or less. As a result, compared to the leakage-type butterfly valve in the related art, the flow rate of exhaust gas at the outer periphery of the valve body 30 of the midway exhaust path 22 is increased and gas replacement in the exhaust path 16 is promoted, so that an effect of suppressing the generation of by-products is obtained. Moreover, since the width of the gap between the valve body 30 and the valve seat 20 is widened, there is an effect of suppressing the gap from being clogged with by-products.

Figure 3A:
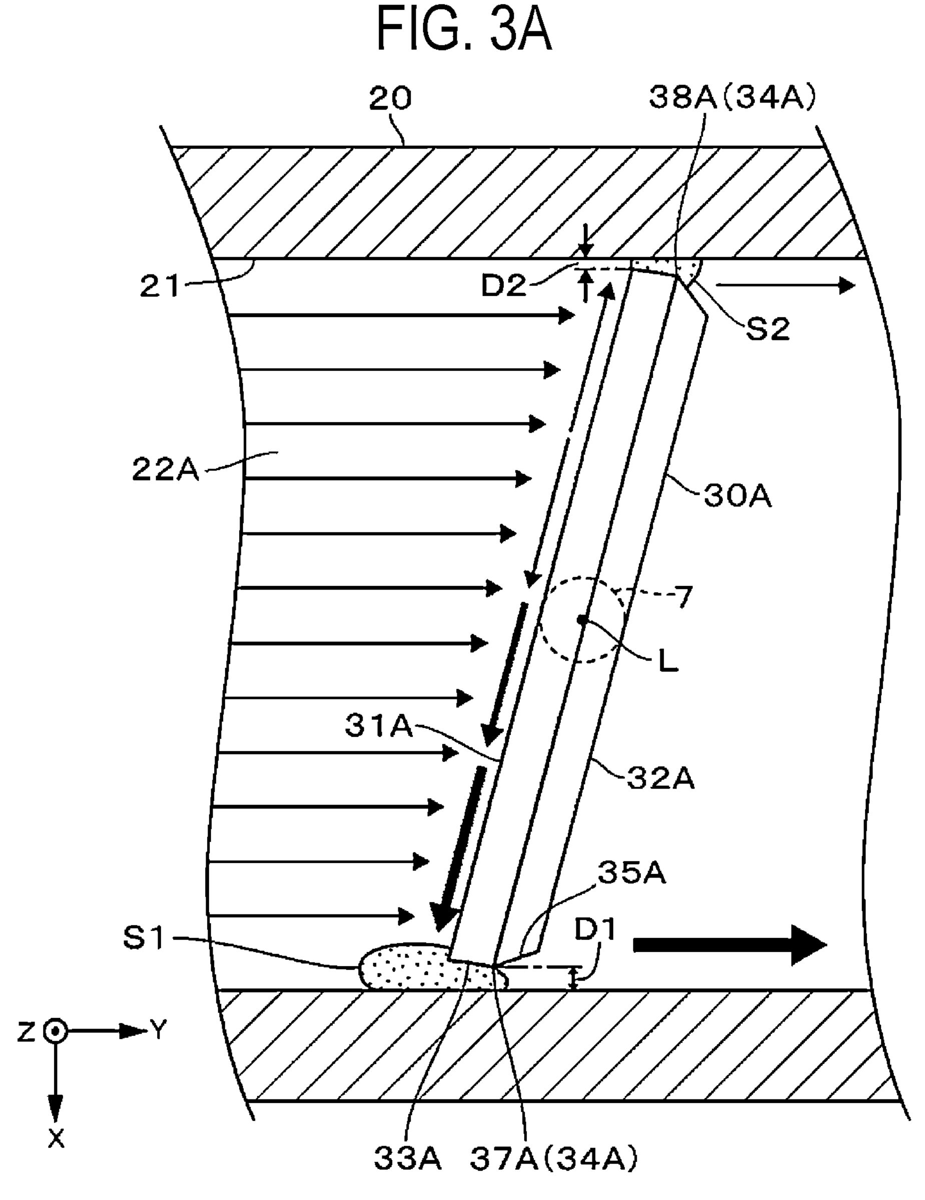
FIG. 3A is a cross-sectional view illustrating a valve body and exhaust streams according to a first comparative mode of the APC valve.
Figure 3B:
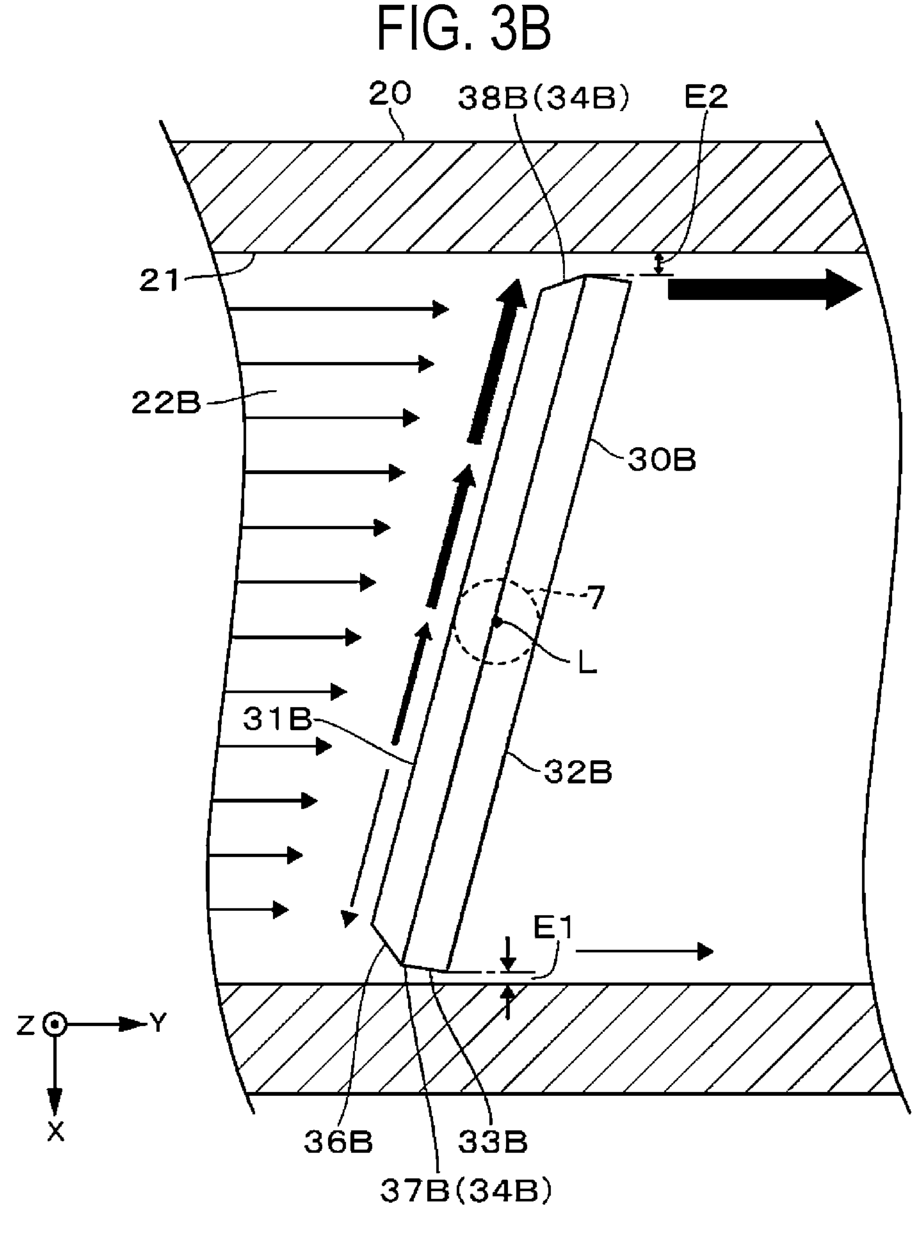
FIG. 3B is a cross-sectional view illustrating a valve body and exhaust streams according to a second comparative mode.
Figure 4:
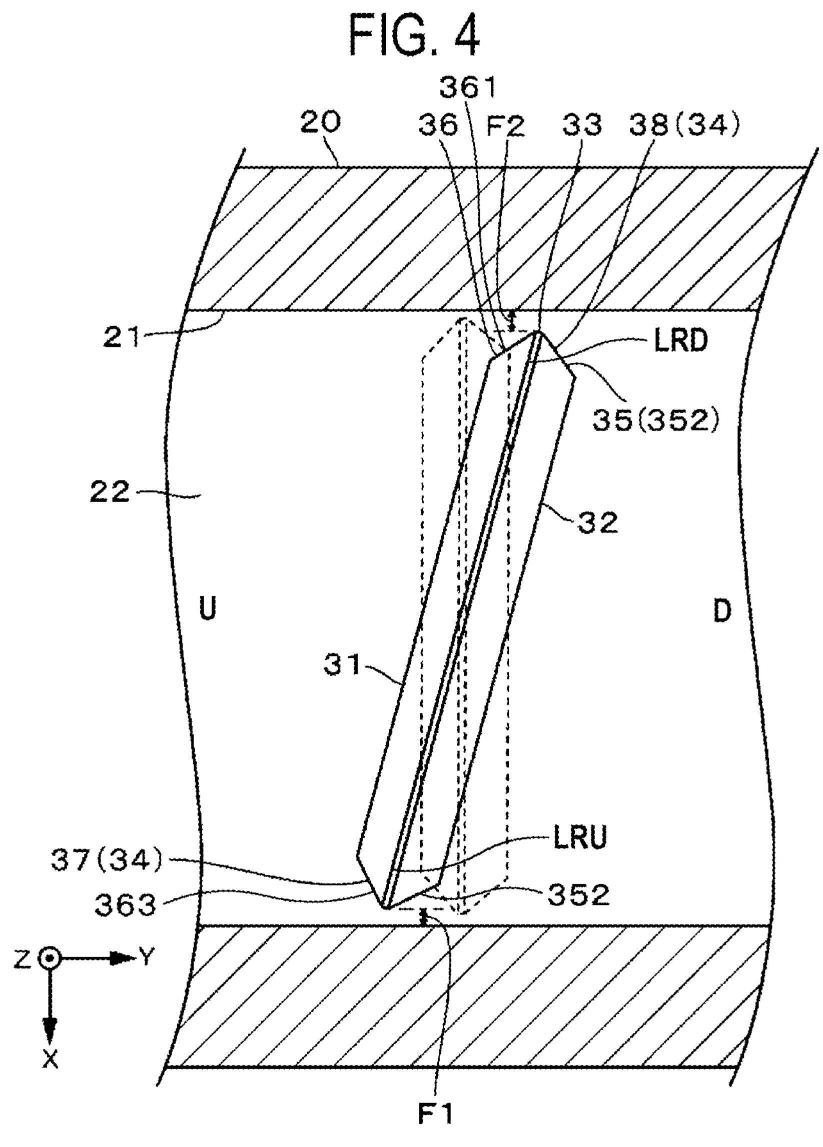
FIG. 4 is a cross-sectional view illustrating a valve body in the present disclosure.

In addition, as illustrated in FIG. 4 to be described later, the valve body 30 of the present disclosure is provided with tapered surfaces (an upstream side tapered surface 36 and a downstream side tapered surface 35) on both the front surface 31 and the rear surface 32. Here, for comparison with the present disclosure, the effect of each shape of the valve body 30A of a first comparative mode and the valve body 30B of a second comparative mode, each of which has a shape different from that of the valve body 30, on the tendencies to generate by-products will be described (FIGS. 3A and 3B). FIG. 3A is a cross-sectional view illustrating a valve body 30A of the first comparative mode, and FIG. 3B is a cross-sectional view illustrating a valve body 30B of the second comparative mode. These cross-sectional views illustrate cross-sections at a diameter position orthogonal to the rotation axis L of the shaft 7 and passing through the center of the disk-shaped valve body 30. The arrows illustrated in FIGS. 3A and 3B indicate the flow of exhaust streams, and the thicknesses of the arrows indicate the magnitude relationship of the flow rates of respective exhaust streams. These drawings illustrate a state in which the inclination angles of the valve bodies 30A and 30B are set to 15 degrees.

As illustrated in FIGS. 3A and 3B, the valve bodies 30A and 30B are located farthest from the rotation axis L at both end portions 34A and 34B where the diameter of the valve body 30 orthogonal to the rotation axis L and the end portions of the valve body 30 intersect. Therefore, when the valve bodies 30A and 30B are arranged to be inclined, the opposite end portions 34A and 34B are separated the most from the inner wall surface 21 of the valve seat 20. When viewed along the circumferential direction of the valve bodies 30A and 30B, from the opposite end portions 34A and 34B, the end portions of the valve bodies 30A and 30B gradually approach the inner wall surface 21 of the valve seat 20 toward the intersection positions with the rotation axis L of the shaft 7 and are in a state of being arranged with the above-mentioned 0.5 mm gap.

Therefore, in the valve body 30 when arranged to be inclined, the conductance of the fluid at the above-described opposite end portions 34A and 34B is greater than the conductance at the other end portions near the rotation axis L. This becomes more pronounced as the inclination angle of the valve body 30 increases.

As illustrated in FIG. 3A, in the valve body 30A of the first comparative mode, an annular downstream side tapered surface 35A is formed along the entire circumference of the downstream side peripheral edge, which is the peripheral edge of the rear surface 32A, which is the downstream side surface. The angle formed by the rear surface 32A and the downstream side tapered surface 35A is set to, for example, 45 degrees. On the other hand, no tapered surface is formed at the upstream side peripheral edge, which is the peripheral edge of the front surface 31A, which is the upstream side surface of the valve body 30A of the first comparative mode. Regarding the valve body 30A when arranged to be inclined, of the two end portions 34A farthest from the rotation axis L, one located on the upstream side is called an upstream side end portion 37A, and the other located on the downstream side is called a downstream side end portion 38A.

In this case, a minimum width D1 of the gap between the upstream side end portion 37A of the valve body 30A and the inner wall surface 21 of the valve seat 20 is larger than a minimum width D2 of the gap between the downstream side end portion 38A of the valve body 30 and the inner wall surface 21 of the valve seat 20. For example, the minimum width D1 of the gap when the inclination angle is 15 degrees is at least twice the minimum width D2 of the gap. Therefore, the conductance at the downstream side end portion 38A of the valve body 30 becomes significantly less than the conductance at the upstream side end portion 37A, and flow bias occurs at the upstream side end portion 37A and the downstream side end portion 38A of the valve body 30. In this way, since a region where conductance is small and exhaust streams hardly flow is formed, gas is likely to remain on the upstream side of the valve body 30A.

In addition, when the exhaust streams uniformly flowing in the direction Y from the upstream of the APC valve 3 flow along the front surface 31A side of the valve body 30A, the exhaust streams directed toward the upstream side end portion 37A change the flow direction thereof when reaching the front surface 31A of the valve body 30A. At this time, after the flow direction of the exhaust streams changes along the front surface 31A of the valve body 30A, when the flow of exhaust streams directed toward the upstream side end portion 37A having large conductance is formed, because the flow direction changes at an acute angle, stagnation is likely to occur. In particular, in the upstream side end portion 37A, the midway exhaust path 22A is narrowed down to the minimum width D1 by the proximity of the side surface 33A of the valve body 30A and the inner wall surface 21 of the valve seat 20 and is then expanded at the downstream side tapered surface 35A. As described above, because the stagnation of the exhaust streams becomes larger in front of the minimum width D1 and the valve body 30A is not provided with a heater, a by-product S1 is likely to be generated between the side surface 33A of the valve seat and the inner wall surface 21 of the valve seat 20 in this region.

On the other hand, the gap between the downstream side end portion 38A of the valve body 30A and the inner wall surface 21 of the valve seat 20 related to the first comparative mode is abruptly narrowed down to the minimum width D2 that is half or less than the minimum width D1 on the side of the upstream side end portion 37A. Therefore, although the exhaust streams flowing through the gap on the side of the downstream side end portion 38A are small, stagnation is likely to occur. In addition, the gap on the side of the downstream side end portion 38A is expanded stepwise from the side surface 33A to the downstream side tapered surface 35A. Since the midway exhaust path 22A is formed in this way, a by-product S2, which is less than the by-product S1 on the side of the upstream side end portion 37A in amount but is denser than the by-product S1, is likely to be generated in the midway exhaust path 22A.

The by-products S1 and S2 generated as described above may hinder the rotation of the valve body 30A, not only making it difficult to change the inclination angle of the valve body 30A, but also preventing the fully closing operation of the midway exhaust path 22. Therefore, the automatic pressure control mechanism 2 requires maintenance to remove the by-products S1 and S2 before the rotation of the valve body 30A becomes difficult.

The problem of adhesion of the by-products S1 and S2 described above is not limited to the valve body 30A related to the first comparative mode having only the downstream side tapered surface 35A described with reference to FIG. 3A. A similar problem also occurs in the valve body 30B of the second comparative mode in which the annular upstream side tapered surface 36B is formed along the entire circumference of the upstream side peripheral edge and no tapered surface is formed at the downstream side peripheral edge as illustrated in FIG. 3B. A minimum width E2 of the gap between the downstream side end portion 38B of the valve body 30B and the inner wall surface 21 of the valve seat 20 is larger than a minimum width E1 of the gap between the upstream side end portion 37B of the valve body 30B and the inner wall surface 21 of the valve seat 20. For example, the minimum width E2 of the gap when the inclination angle is 15 degrees is at least twice the minimum width E1 of the gap. Therefore, the conductance at the upstream side end portion 37B of the valve body 30B becomes much smaller than the conductance at the downstream side end portion 38B. In this way, since a region where conductance is small and exhaust streams hardly flow is formed, gas is also likely to remain on the upstream side of the valve body 30B.

In addition, when the exhaust streams uniformly flowing along the direction Y from the upstream of the APC valve 3 flow on the front surface 31B side of the valve body 30B, the exhaust streams directed toward the downstream side end portion 38B change the flow direction thereof when reaching the front surface 31B of the valve body 30B. At this time, after the flow direction of the exhaust streams changes along the front surface 31B of the valve body 30B, when the flow of the exhaust streams directed toward the downstream side end portion 38B having large conductance is formed, the flow direction changes at an obtuse angle. The exhaust streams then pass through the midway exhaust path 22B at the downstream side end portion 38B. In the downstream side end portion 38B, the midway exhaust path 22B is narrowed down to the minimum width E2 by the proximity of the upstream side tapered surface 36B of the valve body 30B and the inner wall surface 21 of the valve seat 20. Thereafter, since the gap between the side surface 33B of the valve body 30B and the inner wall surface 21 of the valve seat 20 is gradually expanded, stagnation of exhaust streams is likely to occur. From the above, since the stagnation of exhaust streams becomes larger in front of the minimum width E2 and the valve body 30B is not provided with a heater, the state in which by-products are likely to be generated is also formed between the side surface 33B of the valve seat and the inner wall surface 21 of the valve seat 20 in this region.

In addition, the gap between the upstream side end portion 37B of the valve body 30B and the inner wall surface 21 of the valve seat 20 related to the second comparative mode is abruptly narrowed down to the minimum width E1 that is half or less than the minimum width E2 on the side of the downstream side end portion 38B. Therefore, although the exhaust streams flowing through the gap on the side of the upstream side end portion 37B are small, stagnation is likely to occur. In addition, the gap on the side of the upstream side end portion 37B is narrowed stepwise from the upstream side tapered surface 36B to the side surface 33A. It is considered that since this midway exhaust path 22B is formed, by-products are likely to be generated in the midway exhaust path 22B. In addition, since the by-products are generated in the narrowed portions of the downstream side end portion 38B and the upstream side end portion 37B, the rotation of the valve body 30B becomes difficult.

As described above, as confirmed in the first and second comparative modes, in the valve body 30A having the downstream side tapered surface 35A formed only on the rear surface 32A or the valve body 30B having the upstream side tapered surface 36B formed only on the front surface 31B, by-products may be generated and the fully closed operation may not be possible. This is considered to be the same for the valve body that does not include the downstream side tapered surface 35A and the upstream side tapered surface 36B.

FIG. 4 is a cross-sectional view illustrating the valve body 30 in the present embodiment. FIG. 4 also exemplifies the state in which the inclination angle of the valve body 30 is 15 degrees. The valve body 30 of the present embodiment includes an upstream side tapered surface 36 formed along the peripheral edge of the front surface 31 of the valve body 30, a downstream side tapered surface 35 formed along the peripheral edge of the rear surface 32 of the valve body 30, and a side surface 33 formed between the upstream side tapered surface 36 and the downstream side tapered surface 35. The upstream side tapered surface 36 is an annular tapered surface provided along the entire circumference of the upstream side peripheral edge, and the downstream side tapered surface 35 is an annular tapered surface provided along the entire circumference of the downstream side peripheral edge.

By providing the upstream side tapered surface 36 and the downstream side tapered surface 35 as described above, when the valve body 30 is arranged to be inclined, a minimum width F2 of the gap at the downstream side end portion 38 and a minimum width F1 of the gap at the upstream side end portion 37 have dimensions that are substantially aligned with each other. In addition, the minimum width F1 of the gap at the upstream side end portion 37 may be widened to substantially the same extent as the minimum width D1 of the gap at the upstream side end portion 37A of the first comparative mode illustrated in FIG. 3A. In addition, the minimum width F2 of the gap at the downstream side end portion 38 may be widened to substantially the same extent as the minimum width E2 of the gap at the downstream side end portion 38B of the second comparative mode illustrated in FIG. 3B.

Figure 5:
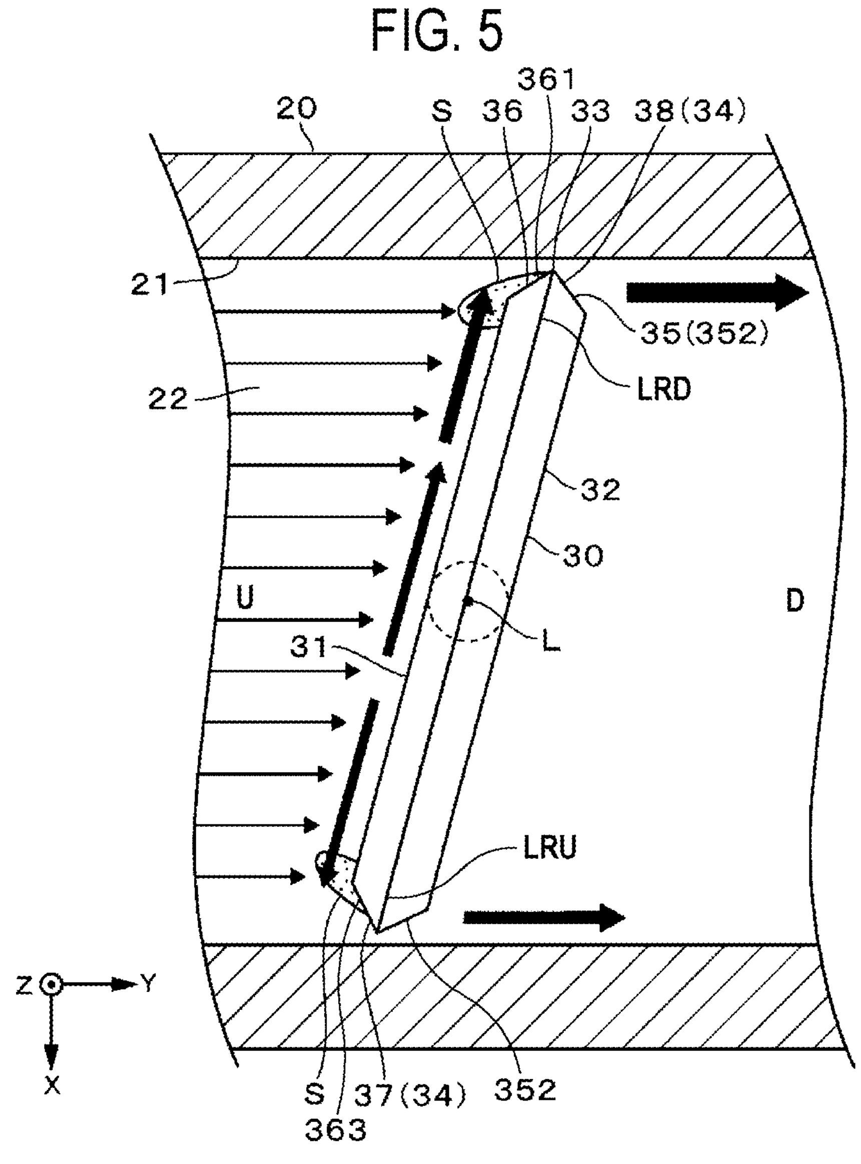
FIG. 5 is a cross-sectional view illustrating exhaust streams in a midway exhaust path in the present disclosure.

As described above, when the valve body 30 of the present embodiment is arranged to be inclined, the minimum widths F2 and F1 of the gaps at the downstream side end portion 38 and the upstream side end portion 37 are substantially equal, and a narrowed portion biased to one side is not formed. In this case, when exhaust streams flow on the front surface 31 side of the valve body 30, as illustrated in FIG. 5, an exhaust flow that changes its flow direction at an obtuse angle and is directed toward the downstream side end portion 38 is more likely to form than an exhaust flow that changes its flow direction at an acute angle and is directed toward the upstream side end portion 37. On the other hand, since the minimum widths F2 and F1 of the midway exhaust path 22 have dimensions which are substantially aligned with each other, there is no significant difference in conductance when the exhaust streams flow through the downstream side end portion 38 and the upstream side end portion 37. Therefore, in the flow streams, flow bias is less likely to occur than in the first and second comparative modes, gas is less likely to remain on the upstream side of the valve body 30 of the present disclosure, and generation of by-products is generally suppressed in the entire exhaust path 16.

Specifically, the upstream side tapered surface 36 and the downstream side tapered surface 35 are chamfered at a taper angle of, for example, 45 degrees with respect to the thickness direction of the valve body 30. In other words, the upstream side tapered surface 36 and the downstream side tapered surface 35 are formed at an angle of 135 degrees with the front surface 31 or the rear surface 32 of the valve body 30. The opening area of the midway exhaust path 22 at the downstream side end portion 38 and the upstream side end portion 37 is sharply narrowed by the upstream side tapered surface 36, the gaps at the side surface 33 become the minimum widths F1 and F2, and then the opening area is abruptly expanded by the downstream side tapered surface 35.

The exhaust streams, which contain a source gas or a reaction gas stagnating here, on the upstream side of the valve body 30 are likely to collide with the upstream side tapered surface 36 when flowing into the gap between the downstream side end portion 38 or the upstream side end portion 37 of the midway exhaust path 22 and the inner wall surface 21 of the valve seat 20. Therefore, by-products are likely to be generated and grow on the upstream side tapered surface 36. In addition, since the exhaust streams, in which the content of the source gas and reaction gas, which generate by-products, has been reduced, pass through the side surface 33 and the downstream side tapered surface 35, adhesion of the by-products in these regions is suppressed. On the other hand, in the region of the inner wall surface 21 of the valve seat 20 facing the upstream side tapered surface 36, the exhaust streams are less likely to collide with the region than the upstream side tapered surface 36, and the heating by the valve seat heater 25 suppresses adhesion of by-products.

However, the minimum width F2 of the gap between the downstream side end portion 38 of the valve body 30 and the inner wall surface 21 of the valve seat 20 is approximately equal to the minimum width F1 of the gap between the upstream side end portion 37 and the inner wall surface 21 of the valve seat 20, but more specifically, is slightly larger than the minimum width F1. As in the first and second comparative modes, when the exhaust streams flow on the front surface 31 side of the valve body 30, stagnation is likely to occur in the exhaust flows directed toward the upstream side end portion 37, and stagnation is less likely to occur in the exhaust streams directed to the downstream side end portion 38. As a result, the exhaust flow rate passing through the downstream side end portion 38 tends to be greater than the exhaust flow rate passing through the upstream side end portion 37. Accordingly, the amount of by-products generated on the upstream side tapered surface 36 tends to be greater at the downstream side end portion 38 than at the upstream side end portion 37.

As described above, the APC valve 3 generally suppresses the generation of by-products, effectively grows the by-products on the upstream side tapered surface 36 to remove residual gas, and suppresses by-products from adhering downstream of the APC valve 3. Therefore, by providing the APC valve 3 upstream of the shut valve 14, it is possible to suppress adhesion of by-products to the shut valve 14 so that the shut valve 14 can also be suppressed from becoming uncontrollable.

The taper angles of the upstream side tapered surface 36 and the downstream side tapered surface 35 are not limited to 45 degrees, but may be greater than 5 degrees and less than or equal to 60 degrees, preferably 15 degrees or more and 45 degrees or less, and more preferably 30 degrees or more and 45 degrees or less. In other words, the angle formed by the upstream side tapered surface 36 and the front surface 31 of the valve body 30 and the angle formed by the downstream side tapered surface 35A and the rear surface 32 are not limited to 135 degrees, but may be 95 degrees or more and less than 150, preferably 105 degrees or more and 135 degrees or less, and more preferably 120 degrees or more and 135 degrees or less.

For example, when the taper angle of the upstream side tapered surface 36 and the downstream side tapered surface 35 is 5 degrees or more when the inclination angle is 15 degrees to 30 degrees, the minimum width F1 of the gap at the upstream side end portion 37 of the valve body 30 and the minimum width F2 of the gap at the downstream side end portion 38 increase as the taper angle increases. In addition, as the taper angle increases, the difference between the minimum widths F1 and F2 of the gaps decreases, so the difference in conductance between the upstream side end portion 37 and the downstream side end portion 38 can be reduced. In particular, when the taper angles of the upstream side tapered surface 36 and the downstream side tapered surface 35 are 15 degrees or more, the minimum width F1 of the gap at the upstream side end portion 37 of the valve body 30 and the minimum with F2 of the gap at the downstream side end portion 38 of the valve body 30 become equal to the distance between the side surface 33 of the valve body 30 and the valve seat 20. Therefore, the minimum width F1 and the minimum width F2 increase or decrease depending on the increase or decrease of the inclination angle, but become substantially the same as each other, so that the conductance can be improved and made uniform.

In addition, in the case where the upstream side tapered surface 36 and the downstream side tapered surface 35 are formed at a predetermined taper angle with respect to the side surface 33 as described above, if the taper angle is set to be large, the upstream side tapered surface 36 and the downstream side tapered surface 35 become wider. As a result, the gap between the valve body 30 and the valve seat 20 is increased, and the conductance is improved. In addition, the upstream side tapered surface 36 has an increased area to which by-products adhere, and the downstream side tapered surface 35 expands the flow path to suppress the adhesion of by-products. From the above, it can be said that the taper angles of the upstream side tapered surface 36 and the downstream side tapered surface 35 are preferably large.

On the other hand, when the taper angle is increased, the upstream side tapered surface 36 and the downstream side tapered surface 35 form a large notch on the front surface 31 or rear surface 32 side of the valve body 30. As a result, there is a possibility that assembly with other structures such as the shaft 7 will be affected. From the above, although depending on the specific specifications or structures of each automatic pressure control mechanism 2 as well, in a comprehensive view, the above-mentioned ranges are suitable for the taper angles of the upstream side tapered surface and the downstream side tapered surface 35A, and it is preferable to keep the taper angles within a range of 30 degrees or more and 45 degrees or less.

When the taper angles are smaller than the above-mentioned preferred range (e.g., 3 degrees), the upstream side tapered surface 36 of the downstream side end portion 38 and the downstream side tapered surface 35 of the upstream side end portion 37 protrude from the side surface 33 to the valve seat 20 side. Therefore, the minimum values F1 and F2 of the gaps become smaller, and the upstream side tapered surface 36 and the downstream side tapered surface 35 become narrower. As a result, the conductance at the upstream side end portion 37 and the conductance at the downstream side end portion 38 are reduced, so residual gas increases and by-products are likely to be generated.

As described above, for the APC valve 3, the width of the gap between the valve body 30 and the valve seat 20 when fully closed and the taper angles of the upstream side tapered surface 36 and the downstream side tapered surface 35 are set within the above-described ranges. As a result, the widths of the gaps at the upstream side end portion 37 and the downstream side end portion 38 of the valve body 30 become large enough to allow the rotation of the valve body 30 within the range of inclination angles of 10 to 30 degrees, which improves the conductance in a well-balanced manner, and reduces residual gas to suppress the generation of by-products. In addition, the valve body 30 grows and collects by-products on the upstream side tapered surface 36 and suppresses by-products from being generated on the downstream side.

In addition, the dimension of the upstream side tapered surface 36 in the thickness direction of the valve body 30, that is, the thickness, is preferably larger than the thickness of the downstream side tapered surface 35A to increase the deposition amount of by-products. The thickness of the side surface 33, which allows the valve body 30 to have the maximum diameter, is preferably 1 mm or less, and the smaller thickness of the side surface 33 is more preferable. As a result, by-products having adhered to the side surface 33 can be scraped off when the valve body 30 rotates. In addition, since the contact area of the exhaust streams with the side surface 33 becomes smaller, it is possible to prevent the flow velocity of the exhaust streams from decreasing, to suppress by-products from adhering to the side surface 33, and to widen, for example, the upstream side tapered surface 36 or the downstream side tapered surface 35.

A film forming process of the film forming apparatus 1 will be described below. First, a wafer W is carried into the processing container 10, the gate valve 62 of the processing container 10 is closed, and the wafer W is accommodated in the processing container 10. Next, heating of the wafer W by the substrate heater 64 is started, and the automatic pressure control mechanism 2 is operated. Regarding the operation of the automatic pressure control mechanism 2, while continuously supplying a predetermined flow rate of purge gas from the purge gas suppliers 43 and 44, the vacuum exhauster 11 is caused to exhaust the interior of the processing container 10, the shut valve 14 is opened, and pressure measurement by the pressure detector 12 is started. Depending on the measured pressure value and the set value of the target pressure, the valve body 30 of the APC valve 3 is adjusted from the fully closed state to a predetermined inclination angle and arranged to be inclined. As a result, the vacuum exhauster 11 exhausts the interior of the processing container 10 through the exhaust path 16, and the APC valve 3 controls the interior of the processing container 10 to approach the target pressure. When the pressure in the processing container 10 becomes substantially constant, the inclination angle of the valve body 30 is fixed.

After the gas supplier 40 performs a purge process of supplying only a purge gas to fill the interior of the processing chamber 10 with the purge gas, a first film forming process of supplying a source gas, a purge process, a second film forming process of supplying a reaction gas, and a purge process are sequentially performed, so that film molecules are formed on the wafer W one layer at a time. To this end, the purge gas, the source gas, the purge gas, and the reaction gas are introduced into the processing container 10 in this order, and these gases pass through the exhaust path 16 in order and are exhausted by the vacuum exhauster 11.

At this time, film formation is performed on the wafer W in the first film forming process and the second film forming process. In addition, since the replacement of the gas in the processing container 10 by the constant exhaust of the automatic pressure control mechanism 2 is almost completed within the purge processes, unnecessary by-products are not generally generated in the processing container 10. On the other hand, in the exhaust path 16 of the automatic pressure control mechanism 2, gas replacement may not be completed upstream of the APC valve 3, the shut valve 14, and the like, and by-products may be generated in the exhaust path 16. However, as described above, the valve body 30 is provided with the annular upstream side tapered surface 36 and the downstream side tapered surface 35. By the action of these upstream side tapered surface 36 and downstream side tapered surface 35, the conductance is improved and made uniform at all circumferential ends of the valve body 30, particularly at the upstream side end portion 37 and the downstream side end portion 38, and the amount of residual source gas or reaction gas is reduced, so that generation of by-products is suppressed.

In addition, since it is possible to reduce the residual gas in the exhaust streams by actively growing by-products grown on the upstream side tapered surface 36 of the valve body 30, by-products can be suppressed from being generated downstream of the upstream side tapered surface 36. Furthermore, since by-products are grown upstream along the upstream side tapered surface 36 of the valve body 30 toward the upstream side, even if the by-products are grown on the upstream side tapered surface 36, the rotating motion of the valve body 30 is less likely to be hindered. As described above, with the APC valve 3 of the present disclosure, the residual gas in the exhaust path 16 of the highly efficient film forming apparatus 1 can be reduced, and the generation of by-products that hinder the rotating motion of the valve body 30 can be suppressed.

The APC valve 3 of the present disclosure is a leakage type, but is not limited thereto. If the upstream side tapered surface 36 and the downstream side tapered surface 35 are formed, the conductance can be improved and made uniform even in a sealed-type valve having a gap width of zero when fully closed. In addition, in the valve body 30 of the present disclosure, the upstream side tapered surface 36 and the downstream side tapered surface 35 are formed over the entire circumference of the valve body 30, but are not limited thereto. For example, the upstream side tapered surface 36 may be provided only on at least the downstream side end portion 38, and the upstream side tapered surface 36 may be formed in each of a first local region LRD in the downstream side end portion 38 and a second local region LRU in the upstream side end portion 37. That is, the annularly formed upstream side tapered surface 36 corresponds to the annular tapered surface on the front surface 31 side in the claims, and includes surfaces corresponding to the first tapered surface 361 provided at the downstream side end portion 38 and the third tapered surface 363 provided at the upstream side end portion 37.

In addition, the downstream side tapered surface 35 may be provided only on at least the upstream side end portion 37, and the downstream tapered surface 35 may be formed in each of the first local region LRD in the upstream side end portion 37 and the second local region LRU in the downstream side end portion 38. That is, the annularly formed downstream side tapered surface 35 corresponds to the annular tapered surface on the rear surface 32 side in the claims, and includes a surface corresponding to the second tapered surface 352 provided at the upstream side end portion 37.

Figure 6:
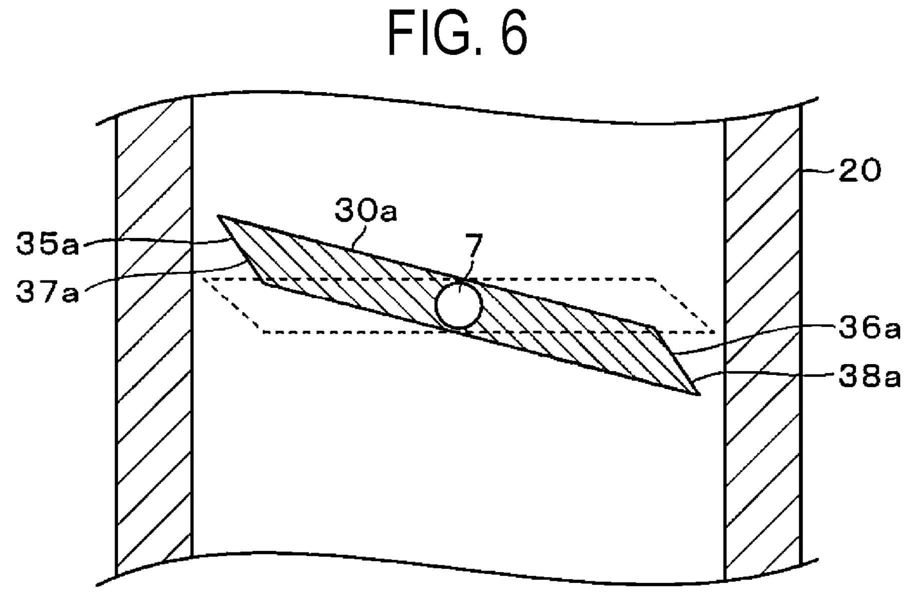
FIG. 6 is a cross-sectional view illustrating a valve body according to a modification.

FIG. 6 illustrates a state in which the valve body 30*a* according to a modification is arranged to be inclined. FIG. 6 illustrates the valve body 30*a* in the fully closed state with the dashed line. In the valve body 30*a*, the upstream side tapered surface 36*a* is formed only in a region on the side of the downstream side end portion 38*a*, and the downstream side tapered surface 35*a* is formed only in a region on the side of the upstream side end portion 37*a*. In this case, when the valve body 30*a* is arranged to be inclined, the conductance of the upstream side end portion 37*a* and the downstream side end portion 38*a* having high conductance can be further improved and made uniform in the entire circumference of the valve body 30*a*. Therefore, even with the valve body 30*a* of the modification, stagnation of exhaust streams upstream of the valve body 30*a* can be reduced to reduce residual gas and to suppress the generation of by-products, and by-products can be grown on the tapered surface 36*a* on the upstream side of the downstream side end portion 38*a* to remove residual gas.

In addition, the film forming apparatus 1 and automatic pressure control mechanism 2 according to the present disclosure have been described by taking a film forming process by an ALD method in which films are formed layer by layer as an example, but the effects thereof are not exhibited only in the film forming process by the ALD method. For other film forming processes, such as a film forming process by a chemical vapor deposition (CVD) method for continuously performing film formation, the film forming apparatus 1 and the automatic pressure control mechanism 2 according to the present disclosure can also promote gas replacement in the exhaust pipe 15 and perform pressure control while suppressing the influence of adhesion of by-products. In addition, the film forming apparatus 1 and automatic pressure control mechanism 2 according to the present disclosure can achieve the same effects even if the film forming process is performed by a thermal decomposition CVD method in which a film is formed by using only a source gas without using a reaction gas. In the film forming apparatus 1 and automatic pressure control mechanism 2, for example, film forming molecules may be unintentionally deposited in the exhaust pipe 15 due to thermal decomposition or reaction of molecules constituting various gases, and molecules containing at least some of the atoms of the molecules constituting the various gases may react unintentionally in the exhaust pipe 15 to form by-products. The by-products resulting from the reaction of the molecules containing at least some of the atoms constituting the various gas molecules containing at least some of the atoms of the various gas molecules or the products of the film forming molecules in the exhaust pipe 15 are unintended products, so they are collectively referred to as by-products.

In addition, it is to be noted that the embodiments disclosed herein are exemplary in all respects and are not restrictive. The above-described embodiments may be omitted, replaced, modified, and/or combined in various forms without departing from the scope and spirit of the appended claims.

EXAMPLES (Preliminary Experiment)

Evaluation experiments were conducted to verify the effects of the automatic pressure control device in the film forming process according to the present disclosure. First, the width of the gap between the valve body 30, which includes the upstream side tapered surface 36 and the downstream side tapered surface 35 with a taper angle of 45 degrees, and the valve seat 20 when fully closed was set within the above-described ranges, and the pressure was controlled within the above-described ranges. In order to perform the film forming process under the above-described setting, the processing container 10 having a capacity of 30 L was connected to a gas supplier 40 that alternately supplies a source gas and a reaction gas at a flow rate of 10 L/min at a temperature of 0 degrees C. and atmospheric pressure. In addition, the processing container 10 was connected to an automatic pressure control mechanism 2 having a vacuum exhauster 11 configured to perform evacuation at 30 KL/min.

Figure 7:
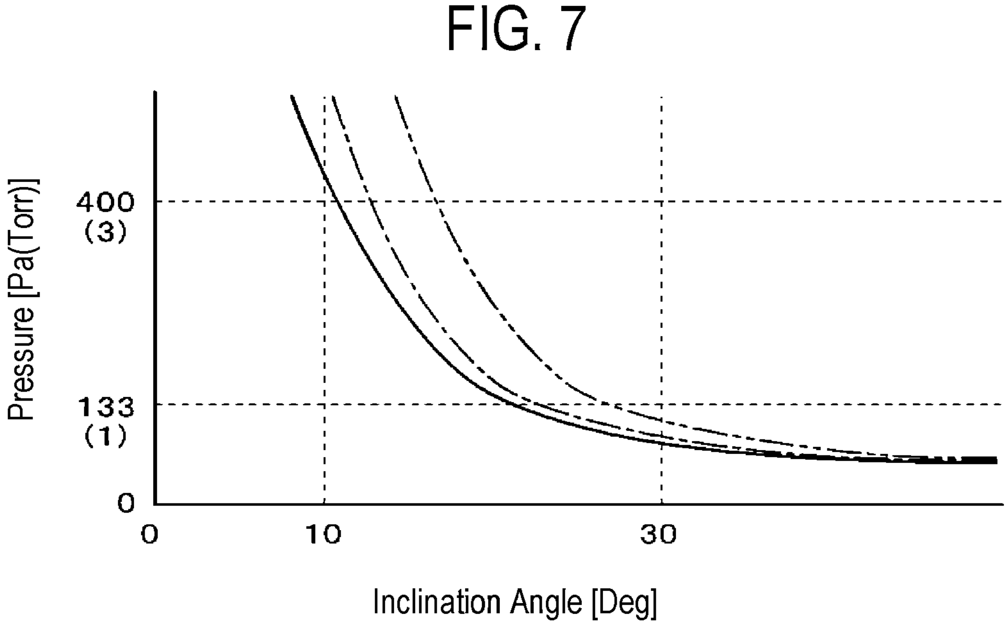
FIG. 7 is a graph showing a relationship between an inclination angle of the valve body and the pressure inside the processing container.

As shown in FIG. 7, regarding the gap width when fully closed, the change in pressure value in the processing container was verified by changing the inclination angle for Sample 1 of 0.1 mm, Sample 2 of 0.3 mm, and Sample 3 of 0.5 mm. In FIG. 7, the two-dot chain line shows the pressure change of Sample 1 having a gap width of 0.1 mm when fully closed, the one-dot chain line shows the pressure change of Sample 2 having a gap width of 0.3 mm when fully closed, and the solid line shows the pressure change of Sample 3 having a gap width of 0.5 mm when fully closed.

According to these results, when the inclination angles of all the valve bodies 30 were within the range of 10 degrees to 30 degrees, it was possible to control the pressure of the processing container 10 from 133 Pa (1 Torr) to 400 Pa (3 Torr). More specifically, since the pressure of the processing container 10 can be controlled within the above-described pressure range over a wide range, which is equal to or more than half of the inclination angle range of 10 degrees to 30 degrees, the pressure control in this range can be easily regulated by the inclination angle of the valve body 30. On the other hand, for example, when the gap width when fully closed is smaller than 0.1 mm, it is necessary to control the pressure within a relatively narrow range on the upper limit side of the inclination angle range of the valve body 30. In addition, for example, as the gap width when fully closed is made larger than 0.5 mm, it becomes necessary to control the pressure within a relatively narrow range on the lower limit side of the inclination angle range of the valve body 30. Therefore, it is preferable to set the gap width when fully closed within the above-described ranges.

EXAMPLES

Figure 8A:
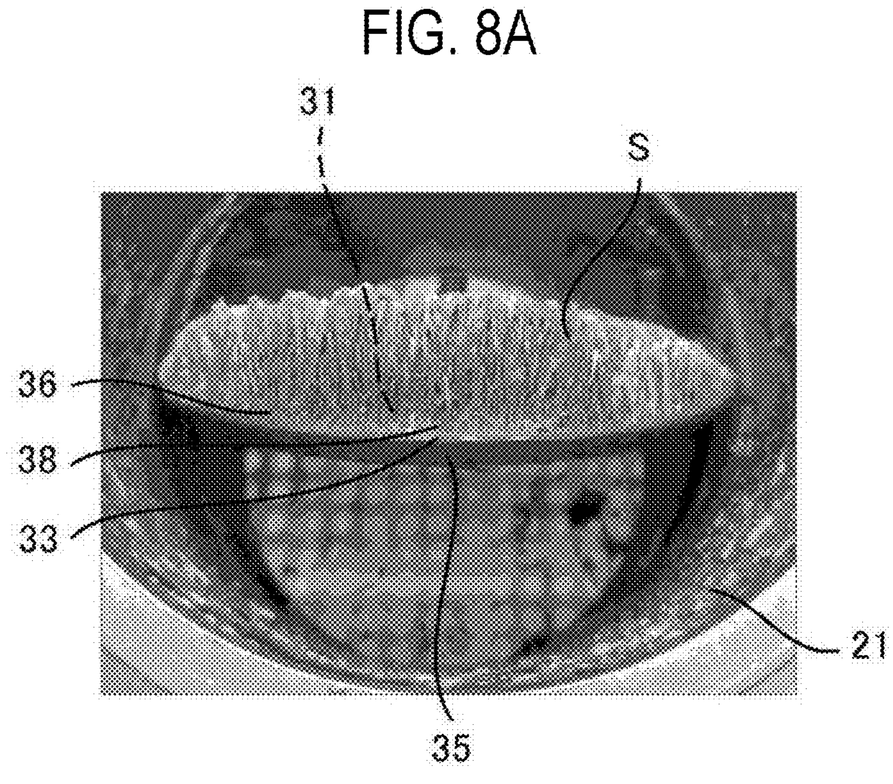
FIG. 8A is a photograph showing results of an evaluation experiment according to an example.
Figure 8B:
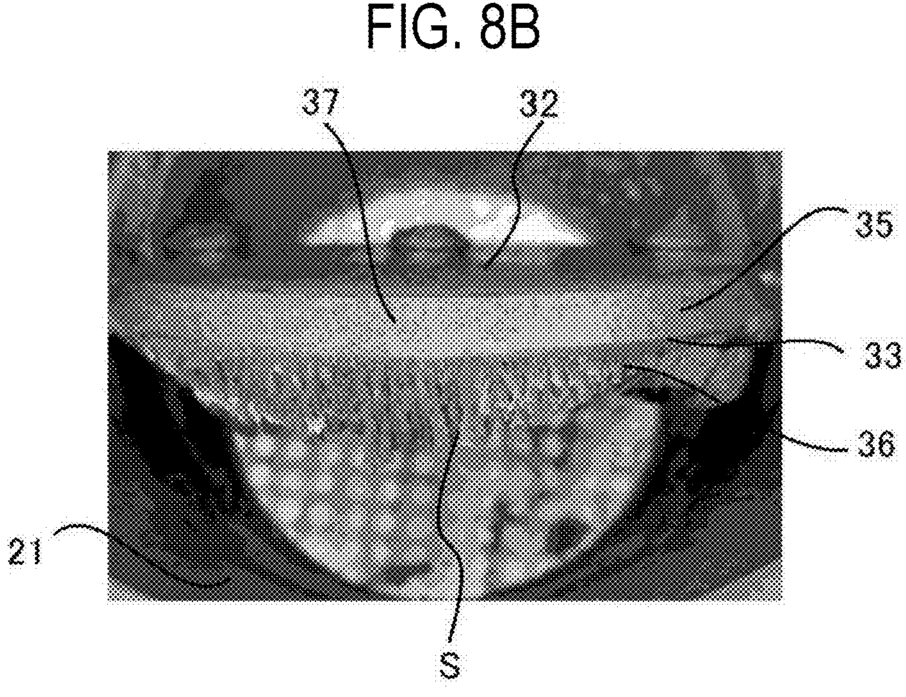
FIG. 8B is a photograph showing results of an evaluation experiment according to an example.

FIGS. 8A and 8B are explanatory views showing images acquired in an evaluation experiment of the automatic pressure control mechanism 2 by using a valve body 30 manufactured according to the embodiment of the present disclosure. FIG. 8A is an image of the downstream side end portion 38 of the valve body 30 acquired from the front surface side, and FIG. 8B is an image of the upstream side end portion 37 of the valve body 30 observed from the rear surface side. FIGS. 8A and 8B show the states in which the automatic pressure control mechanism 2 that uses the above-described valve body 30 of FIG. 4 was operated and film formation was performed on 17,000 wafers W.

The by-products on the upstream side tapered surface 36 of the valve body 30 are a plurality of linear by-products S generated from the downstream side toward the upstream side on the upstream side tapered surface 36, and these by-products are densely formed over the circumferential direction of the upstream side tapered surface 36 at the end portions excluding the rotation axis L side. In addition, the plurality of linear by-products of the upstream side tapered surface 36 were overlapped and thickened on the upstream side tapered surface 36 side of the front surface 31. The by-products grown in this manner are less likely to extend outward from the rotation orbit of the side surface 33 of the valve body 30 during the inclining motion and less likely to interfere with the rotation of the valve body 30 during the inclining motion of the valve body 30.

In addition, these linear by-products S extend relatively long on the side of the upstream side end portion 37 and the side of the downstream side end portion 38, and are generated in a relatively greater amount on the side of the downstream side end portion 38 than on the side of the upstream side end portion 37. No adhesion of by-products was observed on the side surface 33 and the downstream side tapered surface 35. The by-products on the front surface 31 other than the upstream side tapered surface 36 were more conspicuous than the adhesion of by-products on the rear surface 32 other than the downstream side tapered surface 35, but the adhesion of the by-products was suppressed as a whole. In addition, no conspicuous adhesion of by-products was observed on the inner wall surface 21 of the valve seat 20. In addition, although not illustrated, no conspicuous adhesion of by-products to the shut valve 14 was observed. From the above, with the APC valve 3 of the embodiment, under the above-described conditions, the adhesion to the entire exhaust path 16 was suppressed. In addition, while the by-products were effectively recovered from the valve body 30, no problem arose in the inclining motion of the APC valve 3.

COMPARATIVE EXAMPLES

Figure 9A:
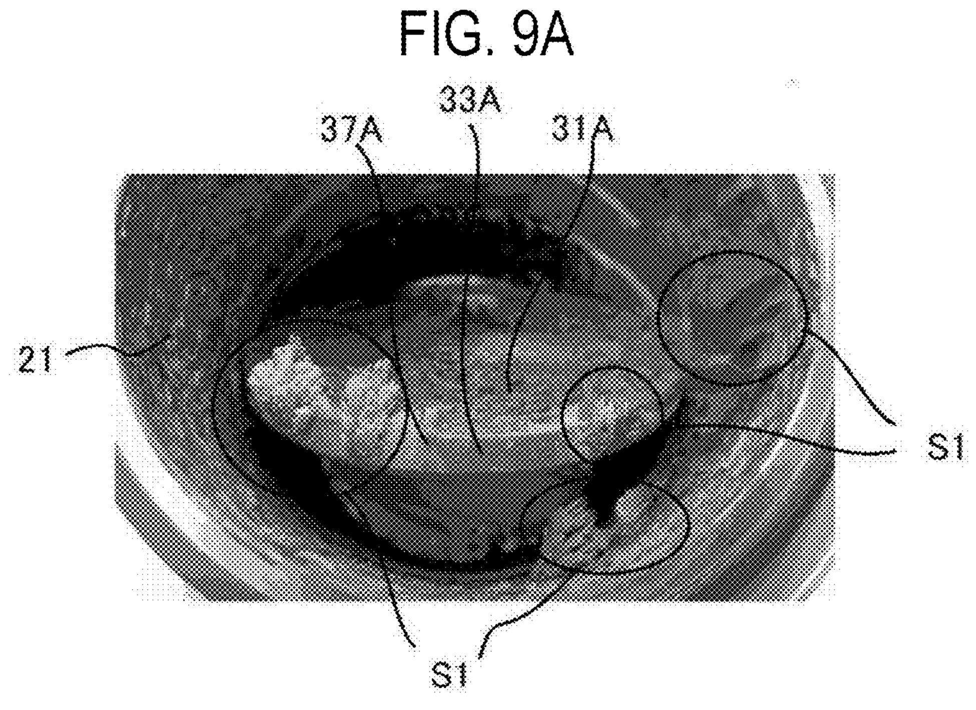
FIG. 9A is a photograph showing results of an evaluation experiment according to a comparative example.
Figure 9B:
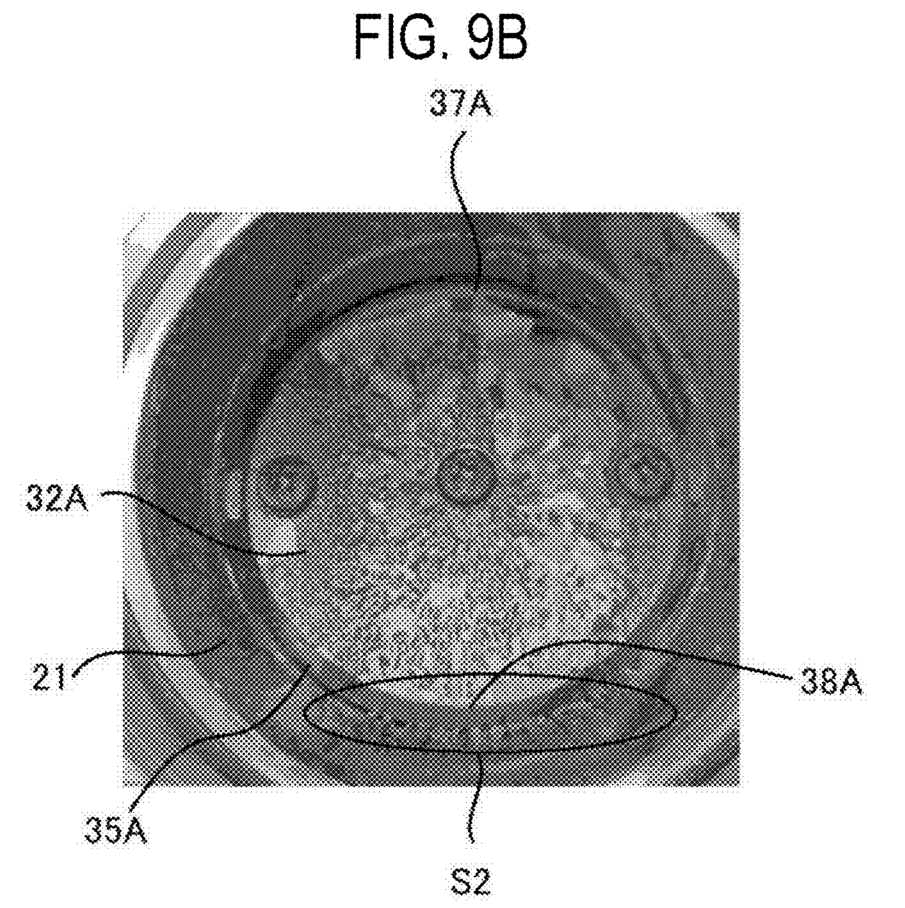
FIG. 9B is a photograph showing results of an evaluation experiment according to a comparative example.
Figure 9C:
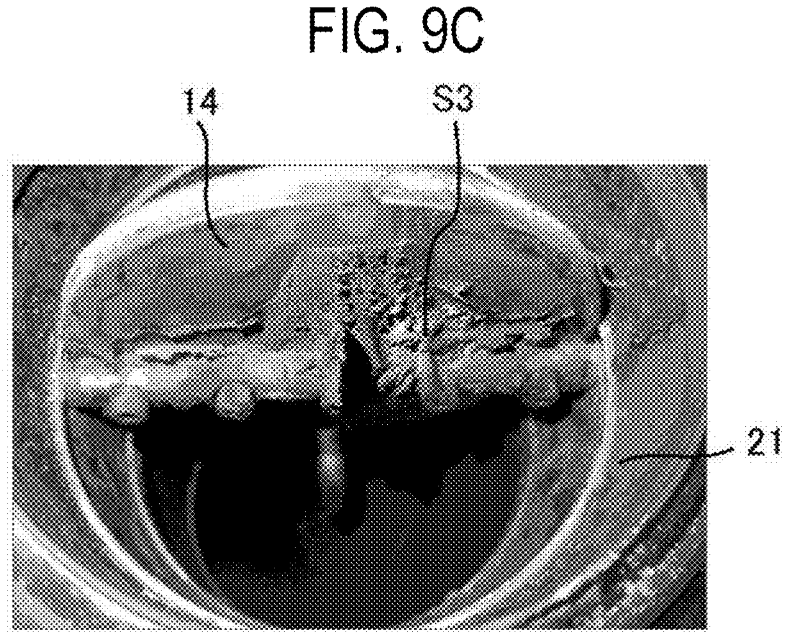
FIG. 9C is a photograph showing results of an evaluation experiment according to a comparative example.

FIGS. 9A to 9C are explanatory views showing images acquired in an evaluation experiment of the automatic pressure control mechanism 2 conducted by using valve bodies 30A manufactured according to the first comparative mode. FIG. 9A is an image of the upstream side end portion 37A of the valve body 30A acquired from the front surface 31A side, FIG. 9B is an image of the downstream side end portion 38A of the valve body 30A acquired from the rear surface 32A side, and FIG. 9C is an image of the shut valve 14 acquired from the rear surface side, which is the surface on the downstream side. FIGS. 9A to 9C show the states in which the automatic pressure control mechanism 2 that uses the above-described valve body 30A of the first comparative mode in FIG. 3A was operated and film formation was performed on 20,000 wafers W.

As shown in FIG. 9A, in the upstream side end portion 37A of the valve body 30A and the portion of the inner wall surface 21 of the valve seat 20 near the upstream side end portion 37A, largely grown byproduct S1 is partially adhered. As shown in FIG. 9B, in the gap between the downstream side end portion 38A of the valve body 30A and the inner wall surface 21 of the valve seat 20, a small amount of by-product S2 was generated densely along the peripheral edge of the downstream side tapered surface of the valve body 30A. The by-products produced in this way are provided to impede the rotation orbit of the opposite ends 34 during the inclining motion. In addition, in the APC valve 3 of the comparative example, by-products were irregularly adhered on the side of the upstream side end portion 37A of the valve body 30A. Therefore, with the valve body 30A of the comparative example, the timing of maintenance cannot be predicted, and it is necessary to perform maintenance early.

As shown in FIGS. 9A to 9C, by-products were widely observed visually over the entire areas of the valve body 30A, the inner wall surface 21 of the valve seat 20, and the shut valve 14 located downstream. It is considered that since exhaust streams stagnated on the upstream side of the valve body 30A and the amount of residual gas increased, by-products were generated in the entire areas which were in contact with the exhaust streams. In addition, regarding the valve body 30A of the comparative example, it is considered that unlike the valve body 30 of the present disclosure, since there is no upstream side tapered surface 36 with a predetermined taper angle, recovery of by-products was not sufficient, and a large amount of a by-product S3 was also adhered to the downstream shut valve.

According to the present disclosure, pressure control can be performed while promoting gas replacement in an exhaust pipe and suppressing the influence of adhesion of by-products. While certain embodiments have been described, these embodiments have been presented by way of example only, and are not intended to limit the scope of the disclosures. Indeed, the embodiments described herein may be embodied in a variety of other forms. Furthermore, various omissions, substitutions and changes in the form of the embodiments described herein may be made without departing from the spirit of the disclosures. The accompanying claims and their equivalents are intended to cover such forms or modifications as would fall within the scope and spirit of the disclosures.

What is claimed is:

1. An automatic pressure control device that controls a pressure in a processing container to which a source gas for forming a film on a substrate is supplied, the automatic pressure control device comprising:

a vacuum exhauster configured to vacuum-exhaust a gas in the processing container;

an exhaust path connecting the processing container and the vacuum exhauster; and a butterfly valve including an annular valve seat having an inner wall surface forming a portion of the exhaust path, and a valve body configured as a plate-shaped body that blocks at least a portion of a cross section that transverses the annular valve seat, the valve body being rotatably installed to the valve seat via a shaft and configured to change an opening area of the exhaust path by being arranged to be inclined and changing an inclination angle of the valve body with respect to the cross section by the shaft, and the butterfly valve being configured to control the pressure in the processing container by changing the inclination angle of the valve body based on a result of detecting the pressure in the processing container, wherein, when an upstream side surface of the valve body is called a front surface and a downstream side surface is called a rear surface as viewed from an upstream side in a flow direction of the gas in the exhaust path, a first tapered surface is formed on the front surface of the valve body in a first local region located in a downstream side end portion in the flow direction when the valve body is arranged to be inclined, and a second tapered surface is formed on the rear surface of the valve body in a second local region located in an upstream side end portion in the flow direction when the valve body is arranged to be inclined, and wherein, when the valve body is arranged to be inclined, the valve body is used with the inclination angle within a range of 10 degrees to 30 degrees, each of an angle formed between the first tapered surface and the front surface excluding the first tapered surface and an angle formed between the second tapered surface and the rear surface excluding the second tapered surface is greater than 95 degrees and less than or equal to 150 degrees.

2. The automatic pressure control device of claim 1, wherein, on the front surface of the valve body, a third tapered surface is formed in the second local region located in the upstream side end portion in the flow direction when the valve body is arranged to be inclined, and a by-product generated due to the source gas remaining in the exhaust path is grown on the first tapered surface and the third tapered surface.

3. The automatic pressure control device of claim 2, wherein, on the front surface of the valve body, an annular tapered surface is formed in an annular shape along a peripheral edge of the valve body, and the annular tapered surface on the front surface includes the first tapered surface and the third tapered surface.

4. The automatic pressure control device of claim 1, wherein, on the rear surface of the valve body, an annular tapered surface is formed in an annular shape along a peripheral edge of the valve body, and the annular tapered surface on the rear surface includes the second tapered surface.

5. The automatic pressure control device of claim 1, wherein the butterfly valve is configured as a leakage-type butterfly valve in which a gap is formed between an inner periphery of the valve seat and an outer periphery of the valve body when fully closed with the inclination angle of 0 degrees, and wherein the gap has a width of 0.1 mm or more and less than 1 mm.

6. A film forming apparatus comprising:

the automatic pressure control device of claim 1;

the processing container configured to accommodate a substrate on which the film formation is performed; and a gas supplier configured to supply the source gas to the processing container.

7. A method of controlling a pressure in a processing container which is included in a film forming apparatus to which a source gas is supplied, the method comprising:

supplying the source gas into the processing container by a gas supplier of the film forming apparatus;

controlling the pressure in the processing container, wherein, in a butterfly valve including an annular valve seat having an inner wall surface forming a portion of an exhaust path, and a valve body configured as a plate-shaped body that blocks at least a portion of a cross section that transverses the annular valve seat, the valve body being rotatably installed to the valve seat via a shaft and configured to change an opening area of the exhaust path by being arranged to be inclined and changing an inclination angle of the valve body with respect to the cross section by the shaft, and the butterfly valve being configured to control the pressure in the processing container by changing the inclination angle of the valve body based on a result of detecting the pressure in the processing container, when an upstream side surface of the valve body is called a front surface and a downstream side surface is called a rear surface as viewed from an upstream side in a flow direction of a gas in the exhaust path, the controlling of the pressure is performed by using a first tapered surface, which is formed on the front surface of the valve body in a first local region located in a downstream side end portion in the flow direction, and a second tapered surface, which is formed on the rear surface of the valve body in a second local region located in an upstream side end portion in the flow direction in the valve body arranged to be inclined at the inclination angle of 10 degrees to 30 degrees, and making a width between the valve body and an inner periphery of the valve seat uniform to exhaust the gas in the processing container; and growing, on the first tapered surface, a by-product generated due to the source gas remaining in the exhaust path, wherein each of an angle formed between the front surface and the first tapered surface and an angle formed between the rear surface and the second tapered surface is greater than 95 degrees and less than or equal to 150 degrees.

* * * * *